US012520094B2

(12) United States Patent
Hlatky et al.

(10) Patent No.: US 12,520,094 B2

(45) Date of Patent: Jan. 6, 2026

(54) ACOUSTIC TRANSDUCER ARRANGEMENT AND METHOD FOR OPERATING AN ACOUSTIC TRANSDUCER ARRANGEMENT

(71) Applicant: HOLOPLOT GmbH, Berlin (DE)

(72) Inventors: Michael Hlatky, Berlin (DE); Philippe Robineau, Berlin (DE)

(73) Assignee: Holoplot GmbH (DE)

(*) Notice: Subject to any disclaimer, the term of this patent is extended or adjusted under 35 U.S.C. 154(b) by 254 days.

(21) Appl. No.: 17/912,650

(22) PCT Filed: Mar. 19, 2021

(86) PCT No.: PCT/EP2021/057145

§ 371 (c)(1),
(2) Date: Sep. 19, 2022

(87) PCT Pub. No.: WO2021/186065

PCT Pub. Date: Sep. 23, 2021

(65) Prior Publication Data

US 2023/0135696 A1 May 4, 2023

(30) Foreign Application Priority Data

Mar. 20, 2020 (DE) ..................... 10 2020 203 659.4

(51) Int. Cl.
*H04S 7/00* (2006.01)
*H04R 1/26* (2006.01)

(52) U.S. Cl.
CPC ................. *H04S 7/30* (2013.01); *H04R 1/26* (2013.01); *H04S 2420/13* (2013.01)

(58) Field of Classification Search
CPC .......... H04S 7/30; H04S 2420/13; H04R 1/26
USPC .......................................................... 381/303
See application file for complete search history.

(56) References Cited

U.S. PATENT DOCUMENTS

| | | | | |
|---|---|---|---|---|
| 4,885,782 A * | 12/1989 | Eberbach | H04R 3/14 | 381/186 |
| 2005/0271230 A1 | 12/2005 | Sasaki | | |
| 2012/0008812 A1* | 1/2012 | Sporer | H04R 1/26 | 381/335 |
| 2012/0207332 A1* | 8/2012 | Dehe | H04R 1/403 | 381/182 |
| 2016/0255434 A1 | 9/2016 | Yamamoto et al. | | |

FOREIGN PATENT DOCUMENTS

| | | |
|---|---|---|
| DE | 102005001395 A1 | 8/2005 |
| DE | 102009006762 A1 | 8/2010 |
| EP | 3062536 A1 | 8/2016 |

(Continued)

OTHER PUBLICATIONS

Berkhout, A.J., "A holographic approach to acoustic control." Journal of the Audio Engineering Society, Dec. 1988, pp. 977-995, vol. 36, No. 12.

(Continued)

*Primary Examiner* — Paul Kim
*Assistant Examiner* — Douglas J Suthers
(74) *Attorney, Agent, or Firm* — Sterne, Kessler, Goldstein & Fox P.L.L.C.

(57) ABSTRACT

Provided is a sound transducer arrangement according to the principle of wave field synthesis. At least one first sound transducer is coupled to a respective acoustic low-pass filter device.

24 Claims, 10 Drawing Sheets

(56) References Cited

FOREIGN PATENT DOCUMENTS

| | | | |
|---|---|---|---|
| EP | 3205116 | B1 | 7/2021 |
| WO | 2015036845 | A1 | 3/2015 |

OTHER PUBLICATIONS

Four Audio, "References", https://www.four-audio.com/en/references/, Apr. 13, 2022, pp. 1-2. (accessed Dec. 12, 2022).
Franz et al., "Bestimmung des frequenzabhängigen akustischen Zentrums eines Lautsprechers im Zeitbereich"; Institut für Hörtechnik und Audiologie Oldenburg, DAGA Numberg, 2015, pp. 788-791. (English-Language Machine Translation of the Summary).
Goerne, T. Tontechnik. München: Carl Hanser Verlag, 2011. (English-Language Abstract).
Goertz et al., "Zur Entzerrung von Lautsprechersignalen für die Wellenfeldsynthese." 25. Tonmeistertagung—VDT Int. Convention, Nov. 2008, pp. 1-14. (English-Language Abstract).
Schroder et al., "Evaluation of beamforming systems", 4th Berlin Beamforming Conference, 2012, pp. 1-10.
Sengpielaudio, "Vokaldreieck. (Vowel Triangle.)" http://www.sengpielaudio.com/Vokaldreieck.htm, 2012. (English-Language Translation).
Von Helmholtz, H. Die Lehre von den Tonempfindungen als physiologische Grundlage für die Theorie der Musik. (On the Sensations of Tone as a physiological Basis for the Theory of Music) Braunschweig, Vieweg und Sohn, 1896, pp. 1-675. (English-Language Summary).

* cited by examiner

ACOUSTIC TRANSDUCER ARRANGEMENT AND METHOD FOR OPERATING AN ACOUSTIC TRANSDUCER ARRANGEMENT

CROSS-REFERENCE TO RELATED APPLICATIONS

This application is the United States national phase of International Application No. PCT/EP2021/057145 filed Mar. 19, 2021, and claims priority to German Patent Application No. 10 2020 203 659.4 filed Mar. 20, 2020, the disclosures of which are hereby incorporated by reference in their entirety.

BACKGROUND OF THE INVENTION

Field of the Invention

The disclosure relates to a sound transducer arrangement and to a method of operating a sound transducer arrangement.

Description of Related Art

For the reproduction of audio signals, the principle of wave field synthesis is well known (see e.g. Berkhout, A. J. (1988): A holographic approach to acoustic control. Journal of the Audio Engineering Society, Vol. 36, No. 12, December 1988, pp. 977-995).

According to the Huygens principle, sound wave fronts are reconstructed from a multitude of elementary waves. Each elementary wave originates from the acoustic centre of a sound transducer, which is driven by its associated amplifier. The superposition of elementary waves is also the basis of beamforming principles, with which sound waves can be emitted preferentially in a desired direction (see e.g. Schroder, Jaeckel, Evaluation of beamforming systems, 4th Berlin Beamforming Conference 2012.4th).

In principle, these elementary waves are to synthesise the wave fronts in the entire audible transmission range. In order that the sound wave fronts synthesised from the elementary waves can be radiated with the same amplitude in every direction, the functional principle requires an undirected half-space radiation of the individual sound transducers. In order to avoid undesired interference in the reproduction range, which manifests itself in aliasing effects, the individual sound transducers should theoretically—even for the upper transmission range (e.g. more than 4 kHz)—be arranged at a distance from each other of less than half a wavelength of the radiated signal.

For the reproduction area, i.e. an indoor and/or outdoor area, wave field synthesis requires a swell-free volume, i.e. all reflections should be avoided. However, because complete acoustic control of the reproduction space is hardly realisable in practice, the wave fronts must be aligned in both the azimuth and elevation planes. In this way, the generation of reflections can be largely avoided by ensuring that the reflection surfaces of the reproduction space are not unintentionally hit by the synthesised wave fronts.

This is not possible with horizontal rows of transducers around the audience, such as those realised in a system at the TU-Berlin (http://www.fouraudio.com/de/referenzen/wellenfeldsynthese-an-der-tu-berlin.html). Directed cylindrical waves are created in the elevation plane.

From WO 2015/036845 A1 it is known to construct larger, two-dimensional sound transducer surfaces in modules according to the principle of wave field synthesis. However, with a two-dimensional transducer array (e.g. DE 2005 10001395 A2) according to the principle of wave field synthesis, the requirement for an aliasing-free reproduction in the entire transmission range leads to a disproportionately high effort, because the total number of transducers quadruples with halving their distance to each other. In practice, such radiating surfaces are therefore constructed in such a way that a largely closed wavefront can be generated up to the forman range of speech reproduction, i.e. approximately up to 4 kHz. The audio frequencies above this are of less importance for the localisation of the sound source, so that direction-dependent aliasing effects are allowed here.

Dynamic loudspeakers are commonly used as sound transducers. However, with the corresponding diaphragm diameter, their natural resonances are several octaves above the lower cut-off frequency of the audio range to be reproduced, which is required for high-quality reproduction. The sensitivity and power handling of dynamic loudspeakers are also far below the values that are standard for larger sound transducers.

It is true that in such a two-dimensional arrangement the efficiency of the individual sound transducers improves with increasing wavelength of the signal, because they work increasingly synchronously with decreasing frequency. The air in front of the diaphragm can therefore no longer escape unhindered to all sides, which is why a larger mass of air is now in front of the diaphragm. Compared to a single sound transducer, the load of the air column that now has to move causes a significantly improved adaptation to the radiation resistance of the air, because the diaphragm now no longer works almost into nothing, but finds a working resistance. This leads to a significant level increase towards lower frequencies. However, this cannot compensate for the steeper drop in sound pressure of the driver below its natural resonance. Therefore, the use of different sound transducers with the corresponding division of the frequency ranges to be radiated is an advantageous solution.

Such a division of the reproduction range into individual frequency ranges leads to only minor irregularities in the vertical directivity of the system in the horizontal WFS transducer rows, such as in the TU Berlin lecture hall (see Anselm Goertz, Michael Makatsch, Christoph Moldrzyk, Stefan Weinzierl: *Zur Entzerrung von Lautsprechersignalen für die Wellenfeldsynthese* (Equalization of loudspeaker signals for wave field synthesis systems), 25th TONMEISTERTAGUNG—VDT INTERNATIONAL CONVENTION, November 2008).

Complex challenges arise in a planar or spatial sound transducer arrangement based on the principle of wave field synthesis. The assembly of the different sound transducers is not possible in one plane, because the wave front must be reconstructed in all three spatial dimensions without large gaps in the spacing of the high-frequency sound transducers. Therefore, the acoustic centres of the elementary waves that make up the wavefront to be synthesised do not lie in a common plane.

FIG. 1 schematically shows a sectional view of a sound transducer arrangement. Three first sound transducers 11 are shown here, which are exemplarily designed as cone sound transducers. A plurality of second sound transducers 12 are arranged between the first sound transducers 11. In the embodiment shown, these are designed as dome sound transducers, which are often used for the high-frequency range. The second sound transducers 12 can also be arranged in the area of the diaphragm of the sound transducer 11, as is known from coaxial loudspeakers, as long as they do not obstruct its sound outlet. The arrangement of several high-frequency loudspeakers in front of the diaphragm of low-frequency loudspeakers is known in principle.

The first sound transducer 11 and the second sound transducer 12 each emit elementary waves 311, 312 which have their point of origin in the acoustic centres 211, 212 of the first sound transducer 11 and the second sound transducer 12 respectively.

In dome transducers, such as the second transducers 12 shown here, the acoustic centres 212 are located approximately on the front side of the dome. With cone sound transducers, like the first transducers 11 shown here, the acoustic centres 211 of the elementary waves 311 are located in the rear part of the cone, slightly in front of the front of the dust dome (Sven Franz, Christina Imbery, Menno Wüller, Jörg Bitzer: "Bestimmung des frequenzabhängigen akustischen Zentrums eines Lautsprechers im Zeitbereich"; Institut für Hörtechnik and Audiologie Oldenburg). The exact position is frequency-dependent. Regarding the superposition of the elementary waves of the first and second sound transducers 11, 12 the position of the acoustic centres in the transition range of their working frequencies is decisive.

As can be seen from FIG. 1, the arrangement and construction of the first and second sound transducers 11, 12 results in a geometric offset of the associated acoustic centres. In particular, the acoustic centres of the first and second sound transducers 11, 12 do not lie on one plane. With respect to the main direction of propagation of the respective sound transducers 11, 12, the first sound transducers 11 lie behind the second sound transducers 12.

This geometric offset cannot simply be compensated in time in the wave field synthesis and also leads to problems in the beamforming methods when superimposing the elementary waves. In the illustration of FIG. 1 it becomes clear that elementary waves 311 of the first cone sound transducer 11, which is offset to the rear, can be temporally adjusted in such a way that a common front line 4 is formed with the elementary waves 312 of the second dome sound transducer 12. However, the radius of the elementary waves 311 of the cone sound transducers 311 is then larger than the radius of the elementary waves 312 of the dome sound transducers 12. This results in an inhomogeneous distribution of the wave fronts.

The superimposition of inhomogeneous wave fronts inevitably leads to directional irregularities in the frequency response and to undesirable side loops, especially in the crossover range. However, it is precisely such side loops that should be avoided as far as possible if the reproduction room is to be avoided. They could create unwanted reflections that would counteract the principle of source freedom of the reproduction space that is inherent in wave field synthesis. Especially in the mid frequency range, where the crossover frequency is usually located, such reflections are easy to localise, which is why they would permanently distort the spatial reproduction.

SUMMARY OF THE INVENTION

It is an object underlying the proposed solution to improve the radiation characteristics of a sound transducer arrangement, in particular it should be possible to compensate for a geometric offset of sound transducers in a sound transducer arrangement.

This object is achieved by a sound transducer arrangement with features as described herein.

At least one first transducer in the transducer arrangement is coupled to a low-pass acoustic filter device.

For example, the acoustic centre of the first sound transducer may be located behind the acoustic centres of the high-frequency sound transducers with respect to the front of the sound transducer arrangement.

The acoustic centre of the first sound transducer and the low-pass filter device can, e.g. in one embodiment, be shifted into a plane with acoustic centres of high-frequency sound transducers as second sound transducers. This makes it possible to ensure a homogeneous superposition of elementary waves even in the transition range of the transmission frequencies, although the chassis of the sound transducers themselves are mounted in different planes. In such a "loudspeaker system", the sound waves no longer emanate from the loudspeaker itself. It only builds up an air pressure in the chamber, not a wave. The sound wave originates at the exit of the air channel from the vibrating air column.

An acoustic low-pass filter device uses the spring effect of a volume of air in series with the mass of the air (1.293 g/l) in a channel. The volume can then be taken to be the chamber volume plus the volume of the membrane cone. Air can only come out of the channel, so the acoustic centre then lies at the outlet of this channel. The acoustic low-pass causes, among other things, a 90 degree phase shift at the outlet of the air channel, which is taken into account when driving high-frequency loudspeakers.

The at least one acoustic low-pass filter device can be placed in front of, i.e. in particular in the main propagation direction of the elementary wave that can be generated by the at least one first sound transducer. However, the filter device can also assume other positions relative to the coupled sound transducer, e.g. be offset or positioned laterally. However, in one embodiment, the outlet of the air channel with its oscillating air mass, which as an acoustic centre is the starting point of the elementary wave of the at least one first sound transducer together with a loudspeaker chassis and the acoustic low-pass filter, can end in the plane of the acoustic centres of the sound transducers.

The acoustic low-pass filter device may be or comprise a mechanical device. As such, it may have a resilient air volume in an air chamber. The air chamber may be located in front of the coupled transducer.

Also, a cavity, in particular the volume of the diaphragm cone, of the coupled sound transducer may be part of the air chamber of the low-pass acoustic filter device and/or part of the sound transducer may be part of the boundary of the air chamber. In particular, a cone of the sound transducer may be part of the air chamber or make up the entire air chamber. However, the cone may also be in air-conducting communication with a further air chamber to the air chamber of the low-pass acoustic filter device. A cone volume of the at least one first sound transducer may be part of or correspond to the resilient air volume.

The low-pass acoustic filter device may have a neck or similar constriction of the air outlet comprising a vibrating air mass.

The neck of the acoustic low-pass filter device does not have to be a tube. Rather, it can deviate from a straight line and have an approximately circular or polygonal cross-section or any other shape. A straight tube can also have a cross-section that deviates from a circular cross-section.

The opening of the neck into the environment may be integrated in a plate in front of the respective at least one first sound transducer; also, an opening in such a plate may be formed as an opening of the neck into the environment or may be formed as the neck itself.

It should be noted that part of the upstream air is relatively rigidly connected to the air in the channel and must therefore be added to the vibrating mass. The corresponding calculation basis for this is known from the orifice correction for bass reflex tubes.

The at least one first sound transducer can be designed as a mid-frequency sound transducer, a low-mid-frequency sound transducer and/or a low-frequency sound transducer. It can be a dynamic loudspeaker, in particular a cone sound transducer, but can also be realised by another transducer principle.

A plurality of first sound transducers may be arranged in a pattern in one embodiment. This pattern can in particular be a one-, two- or three-dimensional grid pattern in which the first sound transducers are arranged regularly or almost regularly (e.g. a slight offset due to aliasing is possible). The grid pattern does not necessarily have to be arranged in a plane, so that grid arrangements in a surface with curvatures are also conceivable. For example, sound transducers of a similar type or a similar transmission range (e.g. mid-frequency, low-mid-frequency or low-frequency sound transducers) can take up an analogue position.

Further sound transducers of the sound transducer arrangement can be arranged in a second pattern, in particular a grid pattern, relative to each other. Further sound transducers can be, for example, high-frequency sound transducers, in particular dome sound transducers. These further sound transducers do not necessarily have to be arranged in a planar pattern either.

The first and second patterns can overlap to form a common pattern or represent a superposition of two grid patterns. In one embodiment, the second sound transducers can also be mounted in the vibrating air mass, in which case their influence on the cut-off frequency of the acoustic low-pass filter must be taken into account.

The at least one acoustic low-pass filter device can be designed as a Helmholtz resonator or have a Helmholtz resonator. A Helmholtz resonator has an air volume of any shape that is connected to the environment via a comparatively small-volume neck. The air in the neck can be regarded as an inert mass. The entire air volume forms an elastic volume, so that a spring-mass system is present. Such a spring-mass system can, for example, be coupled to a sound transducer by being arranged in front of the sound transducer. Thus, the Helmholtz resonator serves as a low-pass filter device.

In a further embodiment, the acoustic low-pass device may be designed such that the numerical value of the ratio of the area of the outlet opening to the product of the volume of its air chamber and the length of its neck is $$\frac{S}{V \cdot L}$$

is between 100 and 5000, the area and volume being expressed in square metres and cubic metres respectively, and the length of the neck being expressed in metres.

If a plurality of first sound transducers of the sound transducer arrangement are coupled with acoustic low-pass filter devices, the acoustic centres of the first sound transducers with coupled low-pass filter devices can lie on a surface, in particular a plane.

Furthermore, the acoustic centre of the at least one first sound transducer with coupled low-pass filter device and of a second sound transducer of the sound transducer arrangement may lie on a surface, in particular a two-dimensional plane.

The surface can be spanned in particular by the acoustic centres of the first and second sound transducers—using the low-pass filter device. Accordingly, the acoustic centres of the first sound transducers and low-pass acoustic filter devices coupled thereto and the acoustic centres of second sound transducers of the sound transducer arrangement can be arranged in a surface, in particular a plane.

The acoustic centre of the at least one first sound transducer can be positionable by means of the coupled acoustic low-pass filter device, in particular displaceable along the direction of sound propagation. This can be used to adjust the spatial radiation characteristic of the sound transducer arrangement, in particular for a homogeneous structure of the elementary waves of the wave field synthesis or a related beamforming method.

The direction of the displacement of the first acoustic centre of the at least one first sound transducer can be collinear to the direction of propagation of an elementary wave generated by the at least one first sound transducer. In this case, the propagation direction of the elementary wave is determined by the vector that is perpendicular to the plane that delimits the half-space into which the sound transducer radiates.

In particular, the acoustic centre of the at least one first sound transducer can be shifted by means of the coupled acoustic low-pass filter device in such a way that it lies on the plane of a second sound transducer, in that the shifted acoustic centre lies on the plane of the height of the acoustic centre of a second sound transducer, the plane of the height of the acoustic centre of a sound transducer being described by the plane which passes through the acoustic centre of the sound transducer and is perpendicular to the vector of the direction of propagation of the elementary waves generated by the sound transducer.

Conversely, the acoustic centre of the first sound transducers can also be shifted by means of the coupled acoustic low-pass filter device so that the acoustic centre of a second sound transducer lies on the plane of the height of the shifted acoustic centre.

In a further embodiment, the additional phase rotation of a signal of the at least one first sound transducer resulting from coupling with an acoustic low-pass filter device can be compensated for by adapting the drive, in particular by delaying the drive of the at least one second sound transducer, so that the elementary waves of the sound transducers in the sound transducer arrangement are superimposed to form a common wavefront.

In one embodiment, the cut-off frequency of the at least one acoustic low-pass filter device can be tuned above, in particular one to two octaves above, a crossover frequency of a transmission range of the respective at least one first sound transducer. Accordingly, the transmission range of the at least one first sound transducer does not have to be substantially changed by coupling with one of the acoustic low-pass filter devices.

Furthermore, second sound transducers, especially for the high-frequency range, can be oriented differently from the main axis of the sound transducer arrangement, which is perpendicular to the two-dimensional sound transducer surface, with the aim of linearising the reproduction for distant listeners who are located far away from the main axis in the radiation direction of the sound transducer arrangement. The main axis of the sound transducer arrangement may be related to a local area in the case of curved surfaces.

The described embodiments also relate to a modular sound transducer system comprising, for example, at least two sound transducer arrangements arranged such that the radiating surfaces of the respective sound transducer arrangements are arranged in a plane, are part of a curved surface or approximate a curved surface. The described embodiments refer to a module in the modular sound transducer system or also to the modular sound transducer system as a whole.

A module in a sound transducer system can in particular be designed as a three-way module or have such a module. This can have first sound transducers, which are designed as cone sound transducers and can be used for the transmission of the medium frequency spectrum. These are each coupled with an acoustic low-pass filter device.

Furthermore, the module can have dome sound transducers that can be used for audio transmission of the upper frequency spectrum. These can be mounted in groups on printed circuit boards in such a way that their distance to each other is smaller than the distance of the mid-frequency loudspeakers to each other. In particular, their distance to each other is smaller than the shortest wavelength of the frequency range to be transmitted without perceptible aliasing effects. At the upper limit of the transmission range, wavelengths of approx. 2.15 cm result. In practice, a distance of 4-12 cm, especially 8 cm, between high-frequency sound transducers is usually sufficient to ensure transmission without perceptible aliasing effects.

BRIEF DESCRIPTION OF THE DRAWINGS

Furthermore, the module may comprise at least one bass sound transducer, which is arranged behind the high-frequency sound transducers and mid-frequency sound transducers and whose generated sound pressure is executable as a double-vented bandpass.

In the following, the interrelationships and embodiments are explained with reference to the drawings.

DESCRIPTION OF THE INVENTION

Figure 2:
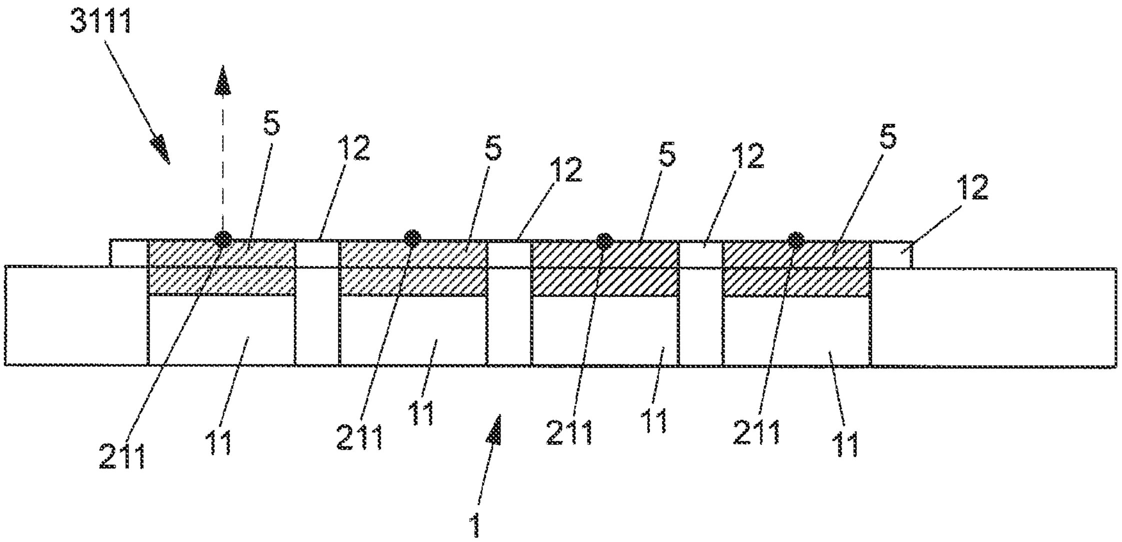
FIG. 2 a schematic sectional view of a sound transducer arrangement in which first sound transducers are each coupled to a low-pass acoustic filter device.
Figure 8:
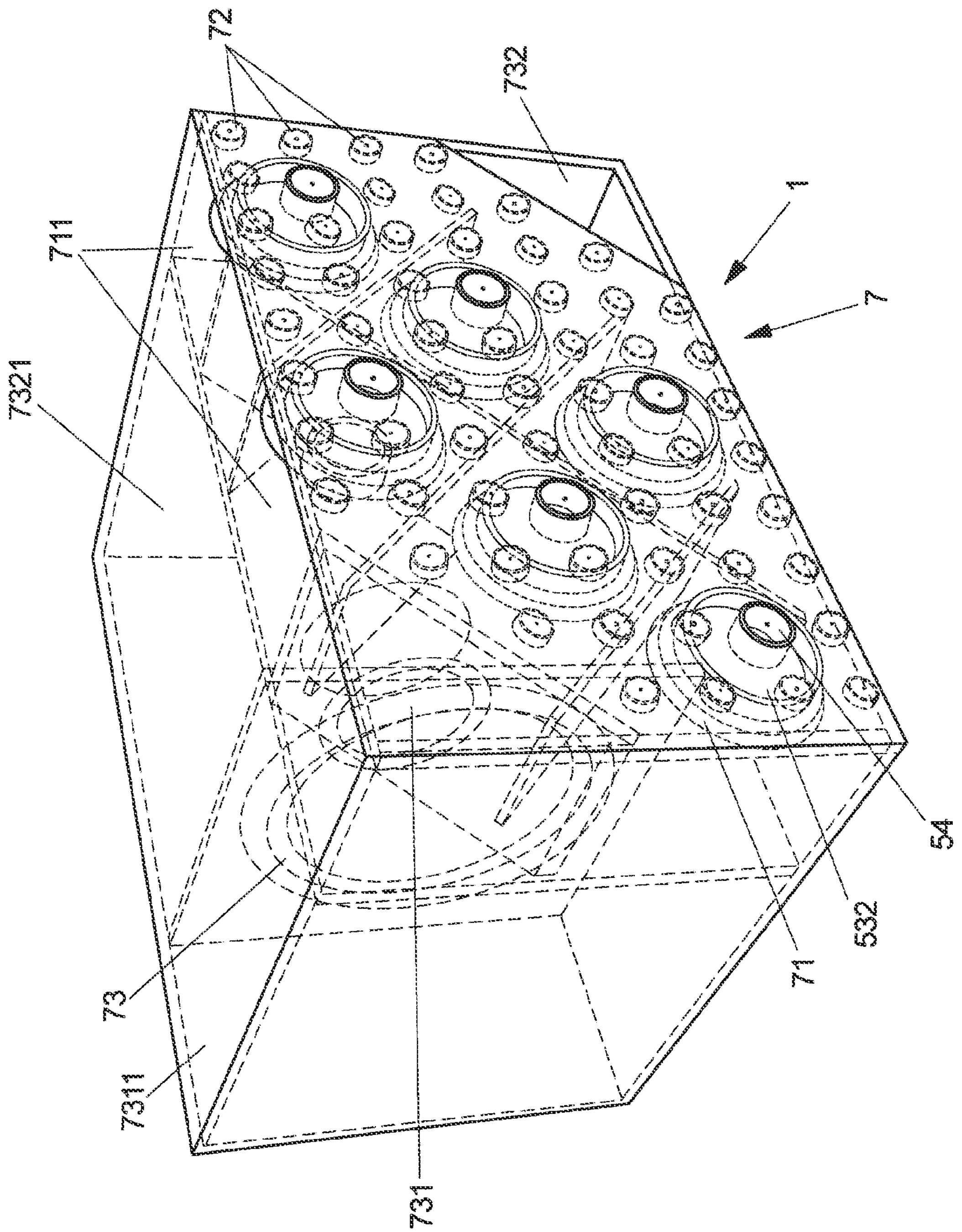
FIG. 8 a perspective view of an exemplary embodiment of a sound transducer module.

FIG. 2 schematically shows a sectional view of a sound transducer arrangement 1 or a sound transducer module 7 (as exemplarily shown in FIG. 8). This and all following embodiments show embodiments for sound transducer arrangements and methods for operating sound transducer arrangements.

Shown are first sound transducers 11, to each of which an acoustic low-pass filter device 5 is coupled. The detail shows four first sound transducers 11, but the number is only to be understood as an example.

The acoustic low-pass filter device 5 is shown here in each case directly in front of the first sound transducers 11, i.e. in particular in the positive direction of propagation 3111 of the elementary wave 311 generated by the respective first sound transducers 11. This positioning is to be understood as exemplary only; a different, e.g. offset or lateral positioning of the acoustic low-pass filter device 5 with respect to the coupled first sound transducer 11 is also possible.

The first sound transducers 11 shown in FIG. 2 are arranged equidistantly on a straight line. In further embodiments, first sound transducers 11 of an area of a sound transducer arrangement 1, of a sound transducer module 7 or also of the entire sound transducer arrangement 1 are arranged relative to each other in a first pattern 611, in particular a grid pattern. This pattern can be a one-, two- or three-dimensional pattern, in particular also such a grid pattern (see e.g. FIG. 5).

Furthermore, FIG. 2 shows second sound transducers 12 whose positions alternate with those of the first sound transducers 11 along the straight line. This particular arrangement is also to be provided by way of example only. The second sound transducers 12 could be arranged in a second pattern 612, in particular a grid pattern. Also, further sound transducers of the sound transducer arrangement shown in an excerpt could be arranged in a second pattern. In one embodiment, the first pattern 611 and the second pattern 612 can overlap to form a common pattern 6, as shown by way of example in FIG. 5.

Second sound transducers 12 referred to in the following may be second sound transducers 12 of the sectional view shown, but also second sound transducers 12 at another position of the sound transducer arrangement 1 shown in detail in FIG. 2. In particular, the second sound transducers 12 do not have to be in direct spatial proximity in the sound transducer arrangement to the first sound transducers 11.

The elementary waves 311 generated by the first sound transducers 11 have their apparent origin in an acoustic centre 211, which is shown as a point in FIG. 2 as an example. The acoustic centre 211 of a first sound transducer 11 may be determined, for example, by the design of the first sound transducer 11. For example, the acoustic centre of a cone transducer is located in the rear part of the cone, approximately at the front of the dust dome.

The acoustic centres 211 of the first sound transducers 11 can be positionable by means of the coupled acoustic low-pass filter device 5, in particular along an axis. This is explained by way of example with reference to FIGS. 3 and 4. The location of the displaced acoustic centre 211 is adjustable and determinable, for example, by the type or construction of the acoustic low-pass filter device 5 and/or by the placement of the acoustic low-pass filter device 5 with respect to the coupled first sound transducer 11.

In particular, the acoustic centre 211 of a first sound transducer 11 can be shifted collinearly to the propagation direction 3111 of the elementary wave 311 generated by the first sound transducer 11 by means of the coupled acoustic low-pass filter device 5.

By coupling with the acoustic low-pass filter device 5, the acoustic centre 211 of the first sound transducers 11 can be positioned such that the radii of curvature of the elementary waves 312, 311 generated by coupled first sound transducers 11 and by second sound transducers 12 are matched or correspond to each other, thus enabling the generation of a homogeneous wavefront 4 by the sound transducer arrangement 1 or the sound transducer module 7.

For example, the acoustic centres 212 of second sound transducers 12 and the acoustic centres 211 of first sound transducers 11 with coupled low-pass acoustic filter device 5 may be positioned on a common surface, in particular on a convex or concave plane.

The acoustic centre 211 of a first sound transducer 11 can be shifted by means of the coupled acoustic low-pass filter device 5 in such a way that the shifted acoustic centre 211 lies on the plane of the height of the acoustic centre 212 of a second sound transducer 12, wherein the plane of the height of the acoustic centre of a sound transducer is described by the plane which passes through the acoustic centre of the sound transducer and is perpendicular to the vector of the direction of propagation of the elementary waves generated by the sound transducer.

The cut-off frequency of an acoustic low-pass filter device 5 determines the frequency range that is attenuated by the filter device, specifically, sound is attenuated above the cut-off frequency and transmitted almost unhindered below the cut-off frequency.

In one embodiment, the cut-off frequency of the acoustic low-pass filter device 5 is tuned above the operating range or above, in particular one to two octaves above, the crossover frequency of a transmission range of the first sound transducer 11 coupled to the acoustic low-pass filter device 5.

In particular, the cut-off frequency can be tuned in such a way that the reproduction frequency range of the first sound transducer 11 is not significantly changed by coupling with an acoustic low-pass filter device 5, in particular the acoustic low-pass filter device 5 has no undesirable audible effect on the transmission range of the coupled first sound transducer 11.

Furthermore, if the cut-off frequency of the acoustic low-pass filter 5 is close to the upper limit of the transmission range of the respective first sound transducer 11 for the lower transmission range, harmonics of the first sound transducer 11 cannot reach the listeners, whereby the distortion factor of the first sound transducer 11 can be reduced.

Figure 3:
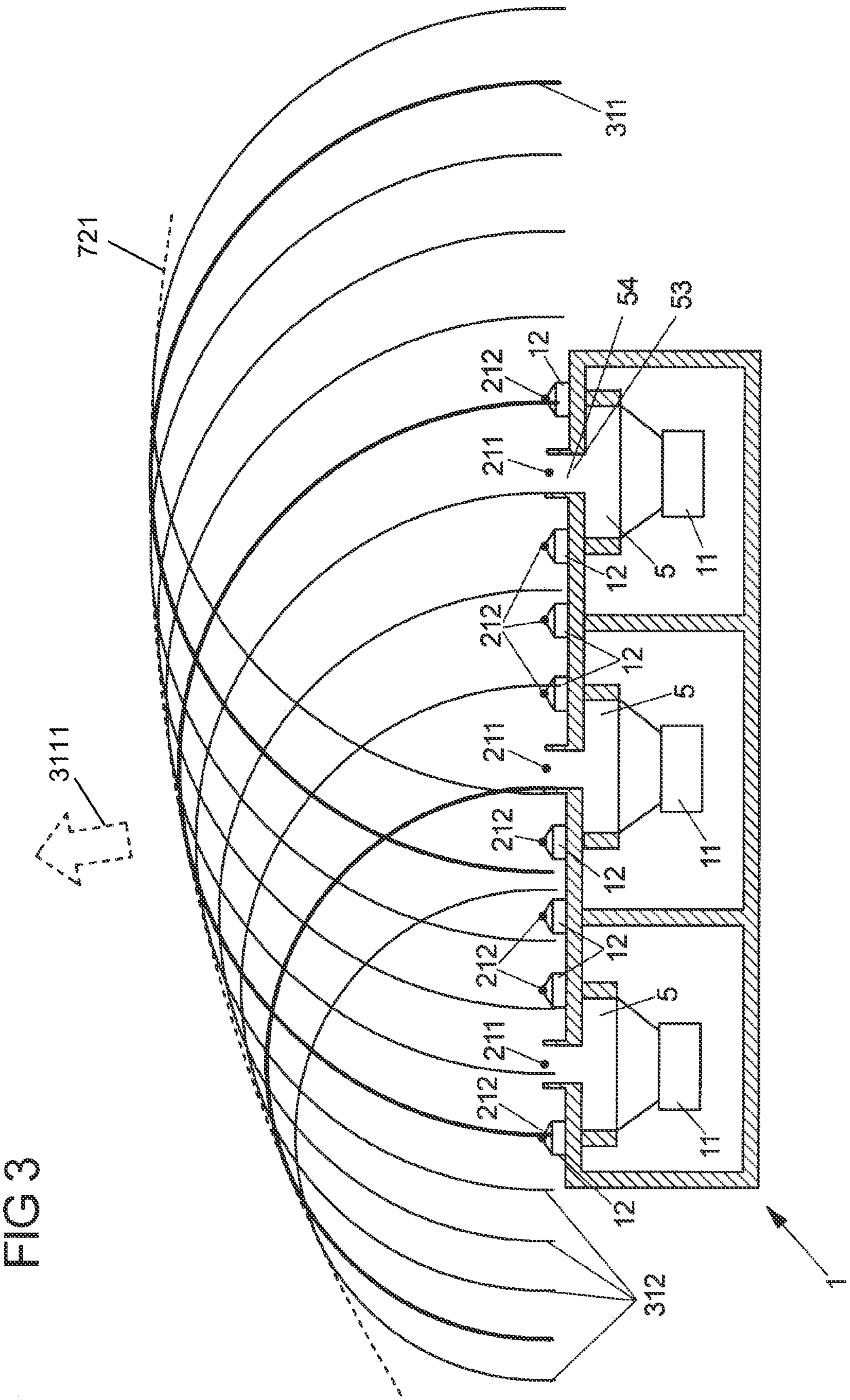
FIG. 3 a sectional view of a sound transducer arrangement in which first sound transducers are each coupled with an acoustic low-pass filter device and the generated elementary waves of the first and second sound transducers are superimposed to form a common, homogeneous wave front.
Figure 4:
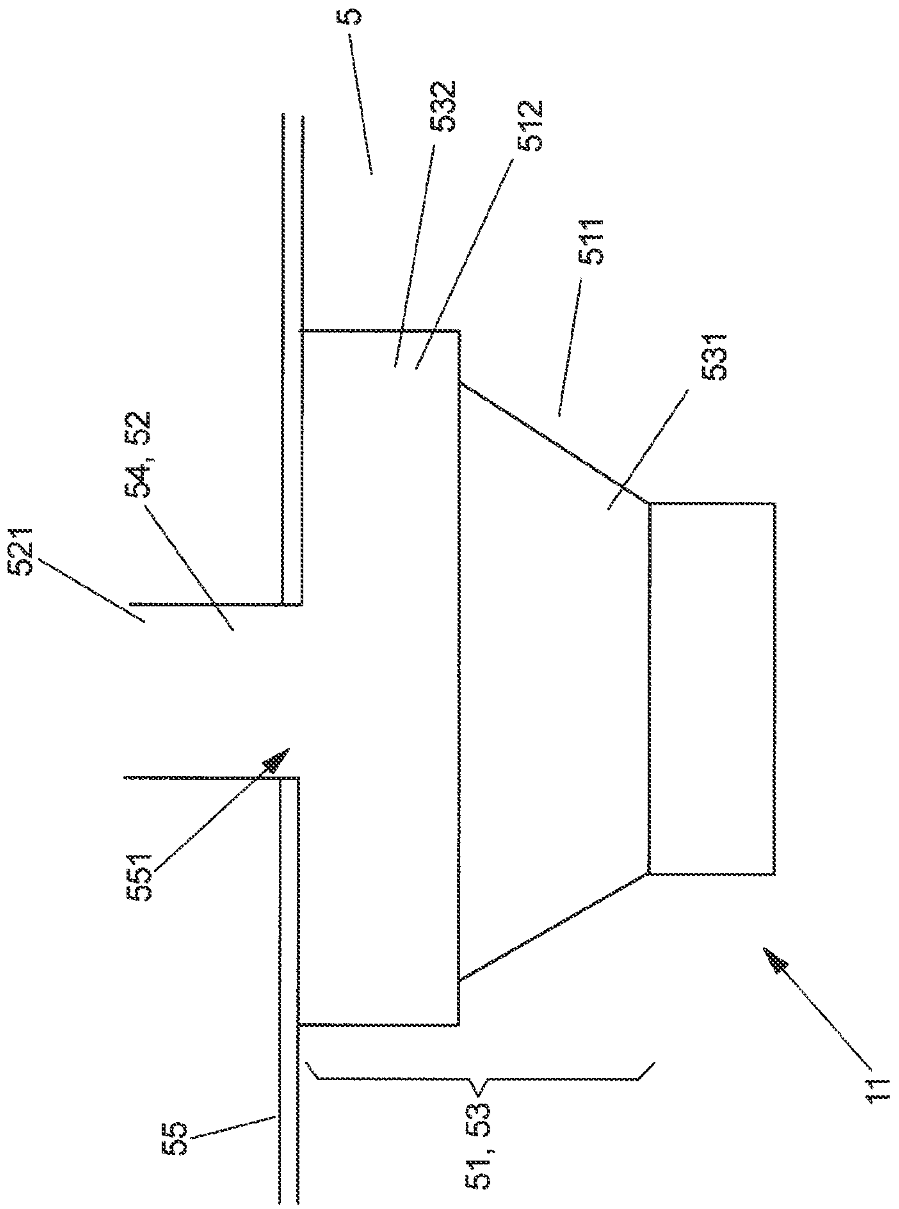
FIG. 4 a first sound transducer of a sound transducer arrangement coupled to a low-pass acoustic filter device.

The first sound transducers 11 can be, for example, mid-frequency sound transducers, low-mid-frequency sound transducers and/or low-frequency sound transducers. These can be realised, for example, as dynamic loudspeakers, in particular as cone sound transducers, as shown in FIGS. 3 and 4. The second sound transducers 12 can be high-frequency sound transducers which are realised as dome sound transducers (FIG. 3). The acoustic low-pass filter devices 5 may in particular comprise resonators (i.e. an air system consisting of a mass and a resilient air volume), as shown in FIGS. 3 and 4.

FIG. 3 shows a sectional view of a sound transducer arrangement 1 or a sound transducer module 7, which is to be understood as a special embodiment of the object of FIG. 2. In particular, descriptions of FIG. 2 can also be applied to FIG. 3. FIG. 3 is also to be understood as an embodiment applied to the object of FIG. 1.

The first sound transducers 11 are exemplarily shown in FIG. 3 as cone loudspeakers, which are usually used for the mid- to low-frequency range.

An acoustic low-pass filter device 5 is coupled to each of the first sound transducers 11. In FIG. 3, this is placed directly in front of each of the first sound transducers 11 and is shown as a mechanical device, which is described in more detail with reference to FIG. 4.

The illustrated mechanical acoustic low-pass filter device 5 each have a resilient air volume 53 in an air chamber 51. In the exemplary embodiment shown in FIG. 3, the air chamber 51 each comprises the cone 511 of the cone sound transducer 11 and a further air chamber 512. Therefore, the resilient air volume 53 each comprises the cone volume 531 and possibly a further air volume 532. However, the air chamber 51 could also correspond to the cone 511 or comprise or include another air chamber of the first sound transducer 11. A part, in particular a wall, of the first sound transducer 11 could be part of the boundary of the air chamber 51. However, the air chamber 51 could also be built independently of the first sound transducer 11, in particular the air chamber 51 could have no common boundaries with the first sound transducer 11.

In the embodiment shown in FIG. 3, the air chambers 51 of the acoustic low-pass filter devices 5 are partly delimited by a plate 55 which is placed in front of the first sound transducers 11.

The embodiment of the acoustic low-pass filter device shown in FIG. 3 further has a neck 52 comprising a vibrating air volume 54. In FIG. 3, the necks 52 of the three low-pass acoustic filter devices 5 are aligned so that their openings 521 into the environment lie in a plane. As shown, openings 551 in the plate 55 partially bounding the air chambers 51 are part of the boundary of the necks 52. This design is merely exemplary.

By coupling with the acoustic low-pass filter devices 5, the acoustic centre of the first sound transducers 11 is shifted approximately at the level of the openings of the necks 52. A comparison of the acoustic centres 211 of the first sound transducers 11 in FIG. 1 with the acoustic centres 211 of the first sound transducers 11 with the coupled acoustic low-pass filter devices 5 in FIG. 3 shows that the acoustic centres of the first sound transducers 11 have been shifted by the coupling with the acoustic low-pass filter devices 5. In particular, the acoustic centres were shifted along the propagation directions of the elementary waves 311 generated by the respective first sound transducers 11. The shifted acoustic centres 211 of the first sound transducers 11 lie on a surface.

FIG. 3 further shows second sound transducers 12, which are exemplarily shown as dome sound transducers, which are usually used for the high frequency range. The dome sound transducers are here exemplarily mounted on the plate 55, which represents the boundary of the air chambers 51 of the acoustic low-pass filter device 5. The plate can also be the carrier board of the second sound transducers.

The first sound transducers 11 and second sound transducers 12 are arranged in a common grid pattern 6, in particular, in the arrangement shown in FIG. 3, a first sound transducer 11 is followed by three second sound transducers 12 in a repetitive manner. This arrangement is to be understood as merely exemplary. The second sound transducers 12 can also be mounted in the area of the opening of the air channel if their influence on the vibrating air mass is taken into account accordingly when dimensioning the acoustic low-pass filter.

In the embodiment shown in FIG. 3, the openings 521 of the necks 52 of the low-pass acoustic filter devices 5 and the domes 721 of the dome sound transducers lie approximately on one surface. Since the displaced acoustic centres (displaced by the acoustic low-pass filter devices 5) lie approximately at the level of the opening of the necks 52 and the acoustic centres 212 of the dome sound transducers lie on their domes 721, the acoustic centres 211 of the first sound transducers 11 with coupled low-pass filter devices 5 and the acoustic centres 212 of the second sound transducers 12 lie approximately on one surface.

In particular, by coupling with the low-pass acoustic filter devices 5, the acoustic centres 211 of the first sound transducers 11, have been shifted to the plane in which the second sound transducers 12 have their acoustic centres 212.

Figure 1:
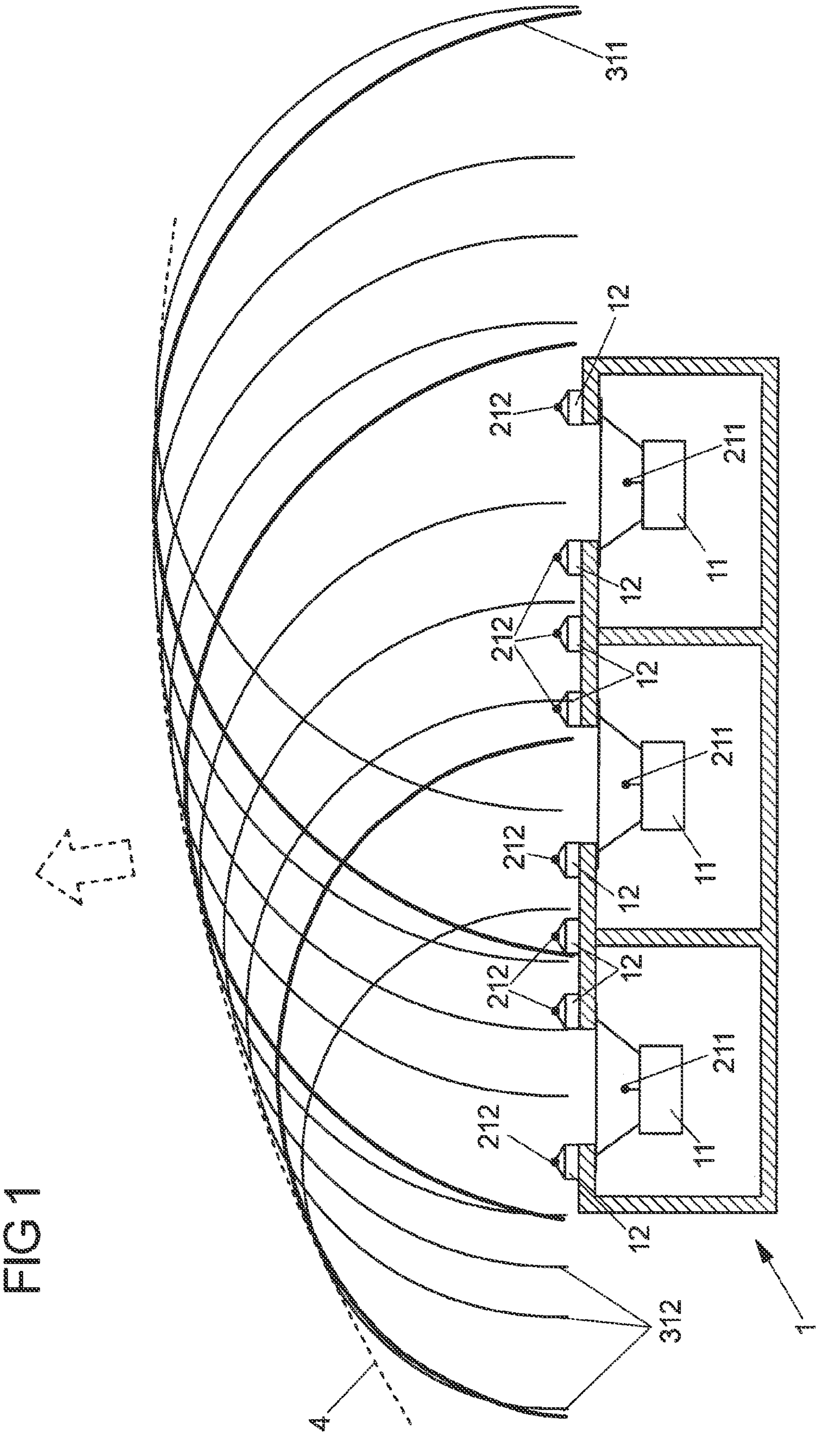
Prior Art FIG 1
FIG. 1 a sectional view of a sound transducer arrangement according to the prior art.

The radii of curvature of the elementary waves 311, 312 of the first sound transducer 11 and the second sound transducer 12 are aligned with each other due to the displacement of the acoustic centres, as shown by a comparison with the radii of curvature of the elementary waves 311, 312 in FIG. 1.

Within the scope of a coupling with an acoustic low-pass filter device 5, a phase shift of the signals of the first sound transducers 11 is effected. This additional phase shift of the signal of the first sound transducers 11 can be compensated by an adapted control of second sound transducers 12, in particular by a delay of the control of the second sound transducers 12, so that the elementary waves 311, 312 superimpose to a common, homogeneous synthesised wave front 4. This is illustrated by a comparison of the wavefront in FIG. 3 with the wavefront in FIG. 1.

FIG. 4 shows a single first sound transducer 11 from a sound transducer arrangement 1, which is coupled to an acoustic low-pass filter device 5. The first sound transducer 11 is exemplarily shown here as a cone sound transducer.

An acoustic low-pass filter device 5 is coupled to the first sound transducer 11. This is shown here in the mechanical embodiment of an acoustic low-pass filter device, which is placed directly in front of the first sound transducer 11.

In the acoustic low-pass filter device 5, a resilient air volume 53 is coupled to a vibrating air volume 54; the former corresponds to a spring. The resilient 53 and the vibrating air volume 54 form a mass-spring system. The resilient air volume 53 is enclosed by an air chamber 51 and the oscillating air volume 52 is enclosed by a short neck 52. This corresponds to a Helmholtz resonator.

In FIG. 4, the air chamber 51 comprising the resilient air volume 53 comprises the cone 511 of the cone sound transducer 11 and a further air chamber 512. Thus, the resilient air volume 53 comprises the cone volume 531 and a further air volume 532.

Part of the boundary of the neck 52 of the low-pass acoustic filter device 5 shown in FIG. 4 is an opening 551 in a plate 55 in front of the first sound transducer 11, i.e. the opening 551 in a plate 55 is integrated into the neck 52. The opening 551 in the plate 55 could also correspond to the opening 521 of the neck 52 into the environment. However, the opening in the plate 551 could also correspond entirely to the neck 52. However, the neck 52 could also have been formed in another way.

If several, e.g. all mid frequency sound transducers, all low frequency sound transducers and/or all low-frequency sound transducers, in a sound transducer arrangement 1 are coupled to an acoustic low-pass filter device 5, a plate 55 in front of the sound transducer arrangement 1 may comprise several openings 551, which respectively serve as openings 521 of the necks 52 of the different acoustic low-pass filter devices 5 or are integrated into the necks 52 of the acoustic low-pass filter devices 5.

In the embodiment shown, the neck 52 is designed as a tube, in particular the neck 52 has a circular cross-section. However, it could also have another cross-section, e.g. a polygonal cross-section. The opening of the neck can also have a different shape, which can be determined in particular by the design of the sound transducer arrangement as a whole or results from the design.

The acoustic centre of the first sound transducer 11 migrates by coupling with the acoustic low-pass filter device 5 to the end of the neck 52 of the acoustic low-pass filter device 5, in which the vibrating air volume 54 determines the upper cut-off frequency of the acoustic low-pass filter device 5.

In the example shown in FIG. 4, the acoustic centre of the first sound transducer 11 is shifted by means of the coupled acoustic low-pass filter device 5 in the propagation direction 3111 or elementary wave 311 generated by the first sound transducer 11.

The calculation of the cut-off frequency of the acoustic low-pass filter device can be done analogously to the calculation of the resonance frequency of a Helmholz resonator. The value of the cut-off frequency of the acoustic low-pass filter device shall be at least one third to one octave higher than the electrical crossover frequency of an electronic crossover of the corresponding sound transducer.

The resonance frequency is calculated according to the following formula $$f = \frac{c}{2\pi}\sqrt{\frac{S}{V \cdot L}}$$

where c is the speed of sound, S the cross-section of the opening of the neck, L the length of the neck and V the volume of the springy air mass. In addition, the orifice opening correction must be taken into account because part of the upstream air must be counted as part of the vibrating mass.

The calculation of the cut-off frequency of this acoustic low-pass filter device can be done analogously to the calculation of the resonance frequency of a Helmholtz resonator. This is calculated according to the formula $$f = \frac{c}{2\pi}\sqrt{\frac{S}{V \cdot L}}$$

where c the speed of sound in m/s, S the area of the exit opening of the neck in $m^2$, L the length of the neck in m and V the volume of the springy air mass in $m^3$.

In addition, the muzzle opening correction must be taken into account, because part of the upstream air must be counted towards the oscillating mass. The formula then changes to $$f = \frac{c}{2\pi}\sqrt{\frac{S}{V \cdot (L + 2d)}}$$

because twice the diameter of the opening of the neck multiplied by the length of the neck is added to the moving air mass. This results in somewhat lower values for the cut-off frequency.

The upper end of the working range of a mid frequency sound transducer is typically between 1 and 4 kHz. With the cut-off frequency of the coupled acoustic low-pass above the transmission range of the mid-frequency loudspeaker, the ratio of the area of the exit port to the product of the volume and length of the neck, for example, $$\frac{S}{V \cdot L}$$

between 100 and 5000.

Figure 5:
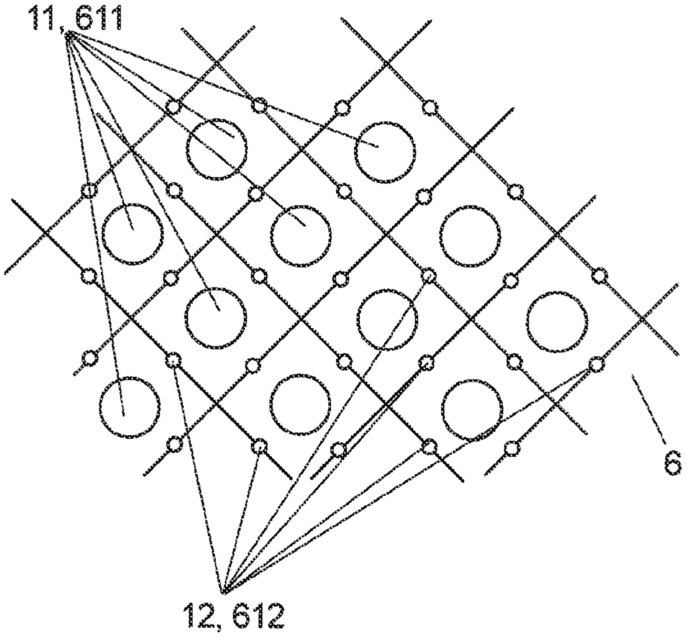
FIG. 5 schematically shows a grid pattern in which first and second sound transducers of a transducer arrangement are arranged relative to each other.

FIG. 5 schematically shows a pattern 6 in which sound transducers of a sound transducer arrangement are arranged. A plurality of first sound transducers 11 arranged in a first grid pattern 611 and further sound transducers arranged in a second grid pattern 612 are shown.

In the form shown, the first grid pattern 611 and the second grid pattern 612 overlap to form a common grid pattern 6.

The first sound transducers 11 can be, for example, mid-frequency sound transducers, low-mid-frequency sound transducers and/or low-frequency sound transducers. These could, for example, have been realised as cone baffles. The first pattern can be a grid pattern, as shown in FIG. 5, but other regular arrangements of the sound transducers are also possible. Also, the pattern may be a one-, two- or three-dimensional pattern. For clarity, the low-pass filter devices 5 coupled to the first sound transducers 11 are shown here only with their mouth opening. A second sound transducer 12 may also be mounted within the mouth opening if its influence is included in the calculation of the low-pass.

In the first pattern 611, for example, sound transducers of a similar construction type or of a similar working range may occupy analogue positions.

The further sound transducers can be, for example, high-frequency sound transducers, low-frequency sound transducers and/or mid-frequency sound transducers. For example, further sound transducers may have been realised as dome sound transducers.

In the second pattern 612, further sound transducers of a similar construction type or a similar working range may occupy similar or repetitive positions. However, their position may also deviate from the regular grid if propagation times and levels for their control are interpolated accordingly to the coordinates of the regular grid. As described in DE 10 2009 006 762 A2, aliasing effects in the upper playback frequency range can be reduced in this way.

The first and second patterns may be a superposition of two grid patterns or may combine to form a common grid pattern. In this grid pattern, sound transducers of a similar type (e.g. cone or dome loudspeakers) or of a similar designated transmission range (e.g. high-frequency, mid-frequency and/or bass sound transducers) can occupy analogue positions.

The solution will be explained in the following by means of a further example of an embodiment. Other designs, also with a different division of the frequency ranges, are possible.

Figure 6:
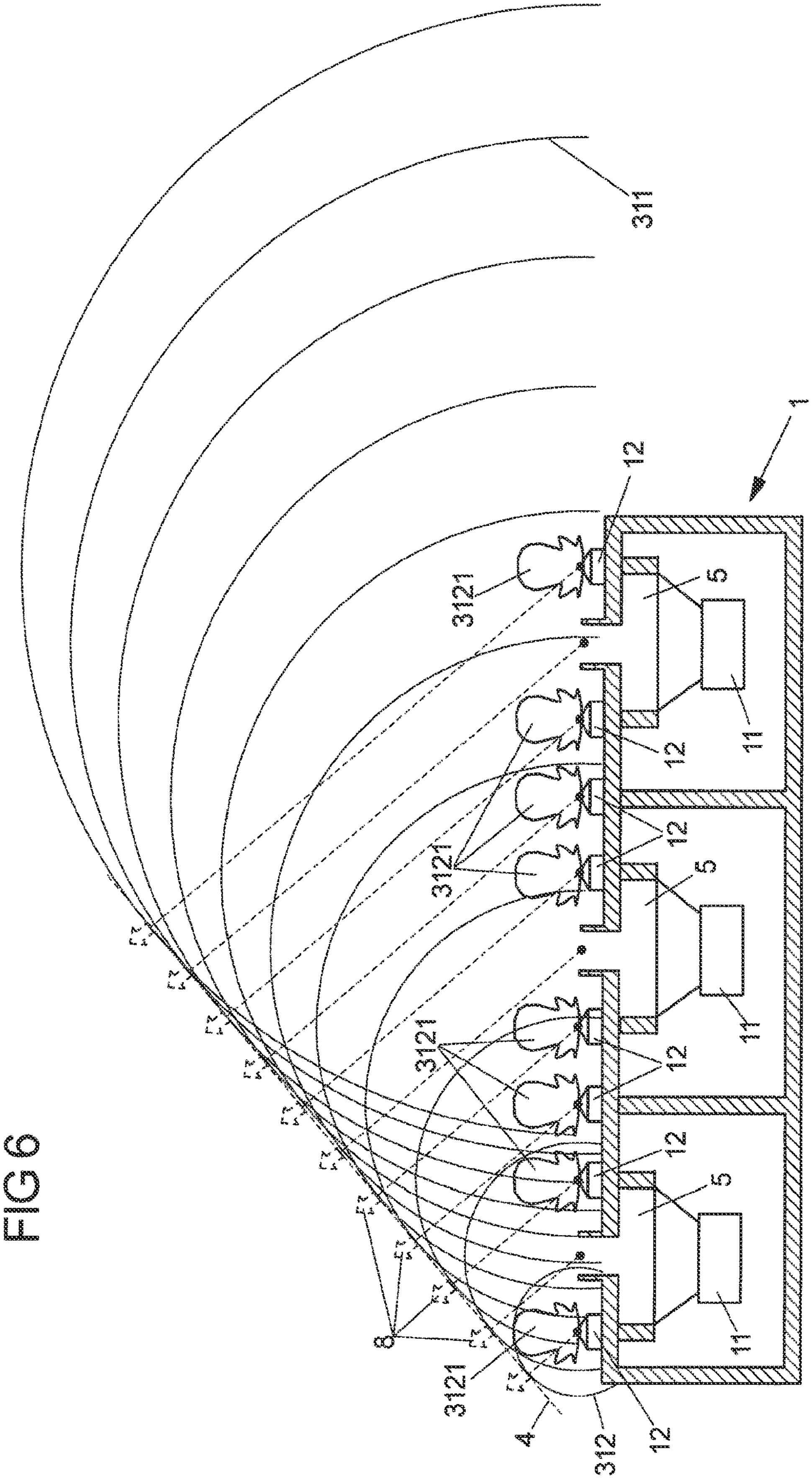
FIG. 6 a sectional view of a sound transducer arrangement in which first sound transducers are each coupled to a low-pass acoustic filter device, resulting in a homogeneous wavefront.

FIG. 6 shows a sectional view of a sound transducer arrangement 1 or a sound transducer module 7 similar to the embodiment according to FIG. 3. The descriptions from FIG. 3 can be transferred to the representation shown here.

In addition, FIG. 6 shows the directional characteristics 3121 of the second sound transducers, which are shown here as dome sound transducers as in FIG. 3. The directions of propagation of the elementary waves generated by the first and second sound transducers run parallel to each other.

High-frequency sound transducers can only radiate evenly in all directions if their membrane diameter is smaller than the wavelength of the sound to be produced. At 16 kHz, this is only 2.15 cm. With such a small diaphragm area, however, only little sound pressure can be generated at the lower end of its reproduction range. Here, a compromise must always be found between even spatial dispersion, maximum sound pressure and the lower cut-off frequency of the transmission range. A crossover frequency as low as possible to the mid frequency sound transducers allows a larger distance between the individual mid frequency sound transducers, because aliasing effects in the crossover area must be avoided. This larger distance then also allows for larger diaphragm diameters, which then allows for more efficient reproduction at the lower end of the reproduction frequency range of the mid frequency sound transducers.

The radiation pattern of high-frequency sound transducers is not constant in all directions; at certain frequencies, directional dips in the radiation are unavoidable. This is illustrated in FIG. 6 by the irregular shape of the directional patterns 3121. These problems increase with the diameter of the diaphragm. For listeners far away from the sound transducer arrangement, the solid angle of adjacent sound transducers is almost the same. This leads to a non-linearity in the frequency response of the reproduction at the relevant frequencies, depending on the position of the listener in the reproduction range.

Figure 7:
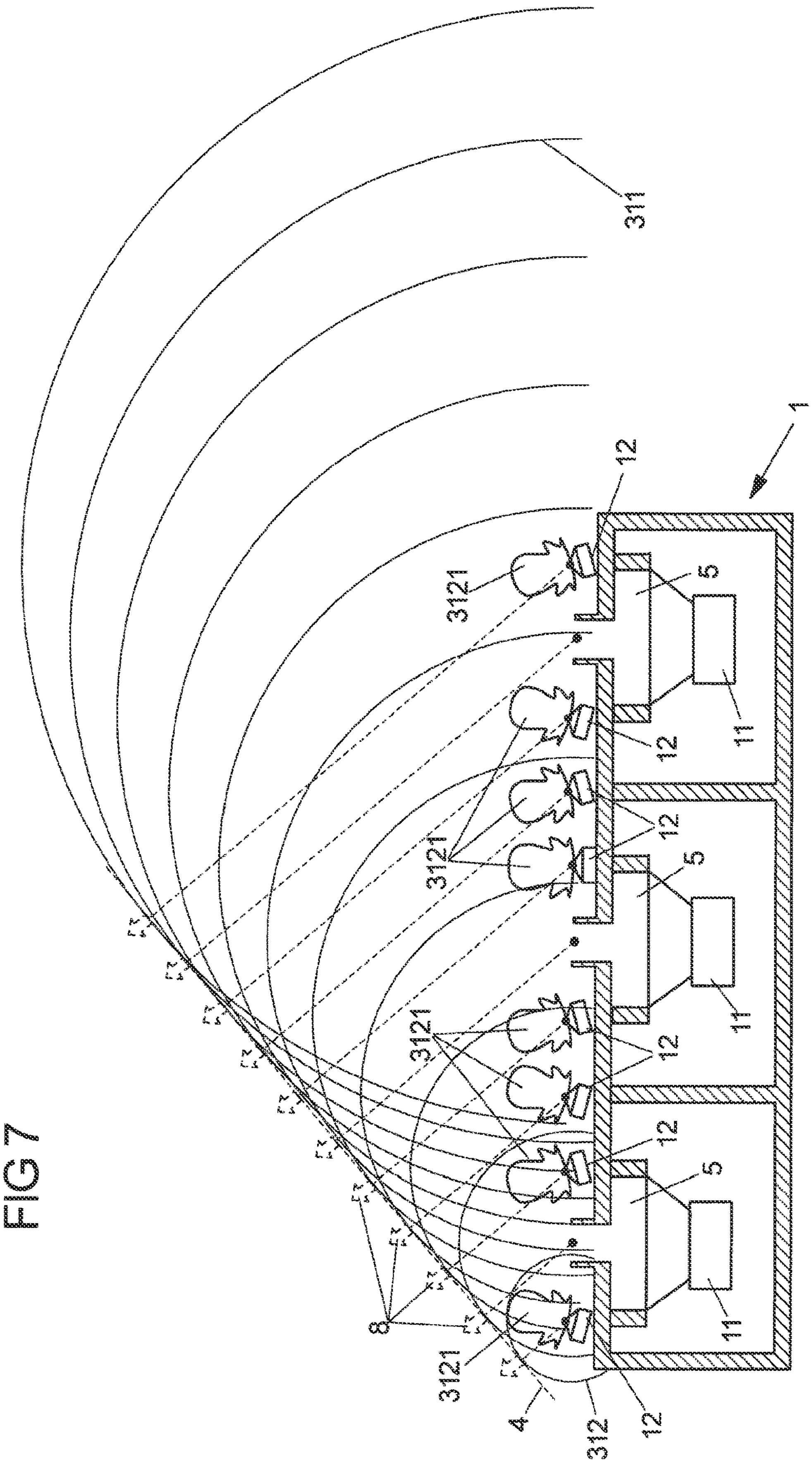
FIG. 7 a sectional view of a sound transducer arrangement in which first sound transducers are each coupled to a low-pass acoustic filter device, and second sound transducers are coupled in a matched orientation.

This non-linearity cannot be compensated for by equalising the overall signal, because this would be associated with an overemphasis of the frequency in question at other places. With reference to FIG. 7, it is explained how the described effect can be reduced.

FIG. 7 shows a sectional view of a set-up comparable to FIG. 6. In contrast to the set-up in FIG. 6, the mounting directions of the second sound transducer 12 have been changed.

In particular, second sound transducers 12, which can be used for the high frequency range in the exemplary set-up, are oriented differently from the main axis 81 of the system. The aim of this is to linearise the reproduction for distant listeners who are located far away from the main axis in the direction of radiation of the sound transducer arrangement 1.

In the exemplary embodiment shown, the high-frequency sound transducers 12 are not mounted parallel on a plate but slightly inclined, as a result of which the angles of inclination of the high-frequency sound transducers are slightly different and deviate in particular from the main axis 81 of the system.

This randomly distributed slight variation in the mounting direction of the high-frequency sound transducers 12 can reduce the effect described with reference to FIG. 6. Although, as in the scenario illustrated by FIG. 6, the radiation pattern of high-frequency sound transducers 12 is not constant in all directions, as represented by the irregular shape of the directional patterns 3121, not all high-frequency loudspeakers are now aligned in the same way when viewed from a particular listening position. In this way, it can be avoided that an extended area of the sound transducer arrangement is mechanically located exactly in the direction towards the listener in which the radiation of a certain frequency is significantly reduced.

FIG. 8 shows an example of the construction of a sound transducer module, which is shown here as a three-way module, according to the principle of wave field synthesis.

The upper frequency spectrum of the audio transmission range is realised with dome sound transducers 72 in the exemplary set-up. For the middle frequency spectrum, cone sound transducers 71 are used and the bass range is implemented as a double-vented bandpass 731, 732.

The dome sound transducers shown in FIG. 8 have a very small overall depth. They are mounted in groups on printed circuit boards, which connect them to the amplifiers at the back of the modules via connectors. Their distance to each other is chosen in such a way that a reproduction largely free of aliasing effects is ensured up to the forman range of the vowels. In their working range, they guarantee a half-space radiation without deep dips in the directional directivity. In principle, however, the proposed solution is not limited to the use of dynamic sound transducers.

At the upper frequency limit of their working range, the diaphragm diameter of high-frequency sound transducers is in the range of the radiated wavelength. Here, therefore, they are relatively well matched to the working resistance of the air and the phase position of the signal can differ significantly between adjacent sound transducers. Therefore, an improvement in efficiency due to improved matching compared to each individual sound transducer is not to be expected here.

In contrast, the phase differences between adjacent sound transducers are small at the lower frequency limit of their operating range. The wavelength of the signal is several times greater than their diaphragm diameter. Here, therefore, the advantage of better matching of the arrangement to the load resistance of the transmission medium comes into play compared to the single sound transducer. The efficiency increases significantly compared to that of an identical single radiator and the weight of the air column now bearing down on the dome shifts its self-resonance significantly downwards. The otherwise necessary coupling of the sound transducer about an octave above its natural resonance can be shifted downwards into the range close to its free-air resonance.

The improved efficiency then contributes to the fact that the sound transducer arrangement 1 can produce higher maximum sound pressure levels than is possible with conventional PA loudspeakers. Because of the distributed arrangement of the sound transducers, the problem does not arise that the air in front of the small diaphragm area of a high-frequency sound transducer has to be compressed to the point of non-linearity in order to still produce the high sound pressure levels that are often common at live events, even in a large audience area. This limits the theoretically possible maximum sound pressure level of conventional loudspeaker systems.

In front of the larger total area of the generating drivers in the planar sound transducer arrangement 1 according to the principle of wave field synthesis, the sound pressure in front of each individual sound transducer remains much lower, so that with appropriate design of the amplifiers and drivers in the audience area, a significantly higher sound pressure can be generated without the non-linearity of the compression curve of the air leading to non-linearities in the perceived audio signal.

In addition, the improved efficiency in the planar sound transducer arrangement 1 makes it much easier to select the sound transducers for the adjacent frequency range. Their distance to each other should again be smaller than the wavelength at the upper limit of their transmission range. This can also be realised practically due to the relatively low coupling of the high-frequency sound transducers 72.

Here the diaphragm diameter of the cone loudspeakers used remains below the radiated wavelength throughout their frequency range. At the lower end of the band, the wavelength of the signal is more than a power of ten greater than each individual diaphragm, so that it would be completely mismatched here if it did not work in the group with the neighbouring sound transducers. In the bass range, the improved matching of the group therefore results in a very significant increase in efficiency, comparable to the better matching of the drivers in horn loudspeakers.

However, drivers with the diaphragm diameter resulting from their relatively small distance from each other are not sufficient to produce the extreme sound pressure in the low bass range that is considered indispensable in the PA area today. The self-resonance of dynamic loudspeakers with a corresponding diameter is usually well above 100 Hz, if they have the high sensitivity required in PA applications. Below the self-resonance, the sound pressure curve falls much steeper than the increase due to the efficiency of the group can compensate.

The two-way modules could be supplemented with external subwoofers as usual. However, integrating the sub-bass range into a wave-field synthesis sound transducer surface has significant advantages when a larger number of modules are combined into one sound transducer surface. In addition to better matching, a sufficiently large wall surface can also achieve a clear directional effect down to the low bass range.

The wavelengths of the signal are so large in the deep bass range that the membrane excursions in the wave field synthesis itself are largely synchronous across several modules. Despite its large diameter, each individual membrane is much smaller in its entire working range than the wavelength of the generated signal. Therefore, the efficiency in the bass range also benefits from the arrangement of the individual sound transducers in the module arrangement of a two-dimensional radiating surface.

Therefore, the exemplary construction is designed as a three-way module 7. The volume required for the bass sound transducer 73 can only be arranged behind the sound transducers for the mid-frequency and high-frequency range 71, 72. This creates the problem that the generated sound pressure must find its way to the front of the plane sound transducer arrangement 1. The continuity of the radiating surface in front of the sound transducer must be disturbed as little as possible, because this causes diffraction effects with corresponding side lobes in the directional characteristic.

As can be seen in FIG. 8, the exemplary solution is therefore designed as a double-vented acoustic bandpass filter device 731, 732. The two forward channel interrupt the structure of the high-frequency sound transducers 72 and mid-frequency sound transducers 71 only to a tolerable extent, but the operating principle of the double-vented allows an efficiency with which the bass range does not drop against the high sound pressure of the upstream sound transducer arrangement 1 for the mid- and high-frequency range. In principle, it would also be possible to arrange high-frequencies in the area of the openings of the double-vented bandpass system, if they were included in the calculation of the system. However, the air movement in the channels of the sketched example is so strong that audible swirling noises are to be expected then.

The high efficiency of the double vented bandpass 731, 732 bass sound transducer is due to the limited bandwidth and the non-linearity of the phase response.

However, with the radiated wavelength of several metres, both openings in the front can almost be considered as a common acoustic centre. Thus, a temporal correction is possible without creating an inhomogeneous field in the transition area. However, a time correction increases the latency of the system considerably with the large wavelengths in this area. This becomes a problem with every live performance. Here, it must be weighed up whether a low latency of the system or a linear phase response has priority. Compromises or different setups are possible here.

The wavelengths of the signal are so large in the deep bass range that the membrane excursions in the wave field synthesis itself are largely synchronous across several modules. Despite its large diameter, each individual membrane is much smaller in its entire working range than the wavelength of the generated signal. Therefore, the efficiency in the bass range also benefits from the arrangement of the individual sound transducers in the module arrangement of a two-dimensional radiating surface.

Basically, one can speak of a two-dimensional sound transducer arrangement if the individual sound transducers are not only arranged in a row (linear). In this case, e.g. a slight offset of individual sound transducers perpendicular to the linear extension can usually be neglected.

When speaking of a three-dimensional sound transducer arrangement, the arrangement of individual sound transducers perpendicular to the surface is important in addition to the planar arrangement. The entire surface can also be curved or bent.

In this sense, the embodiments described above, e.g. according to FIG. 8, can be described as three-dimensional sound transducer arrangements. In these embodiments, the relative distance of the individual sound transducers to each other is quite important.

Figure 9:
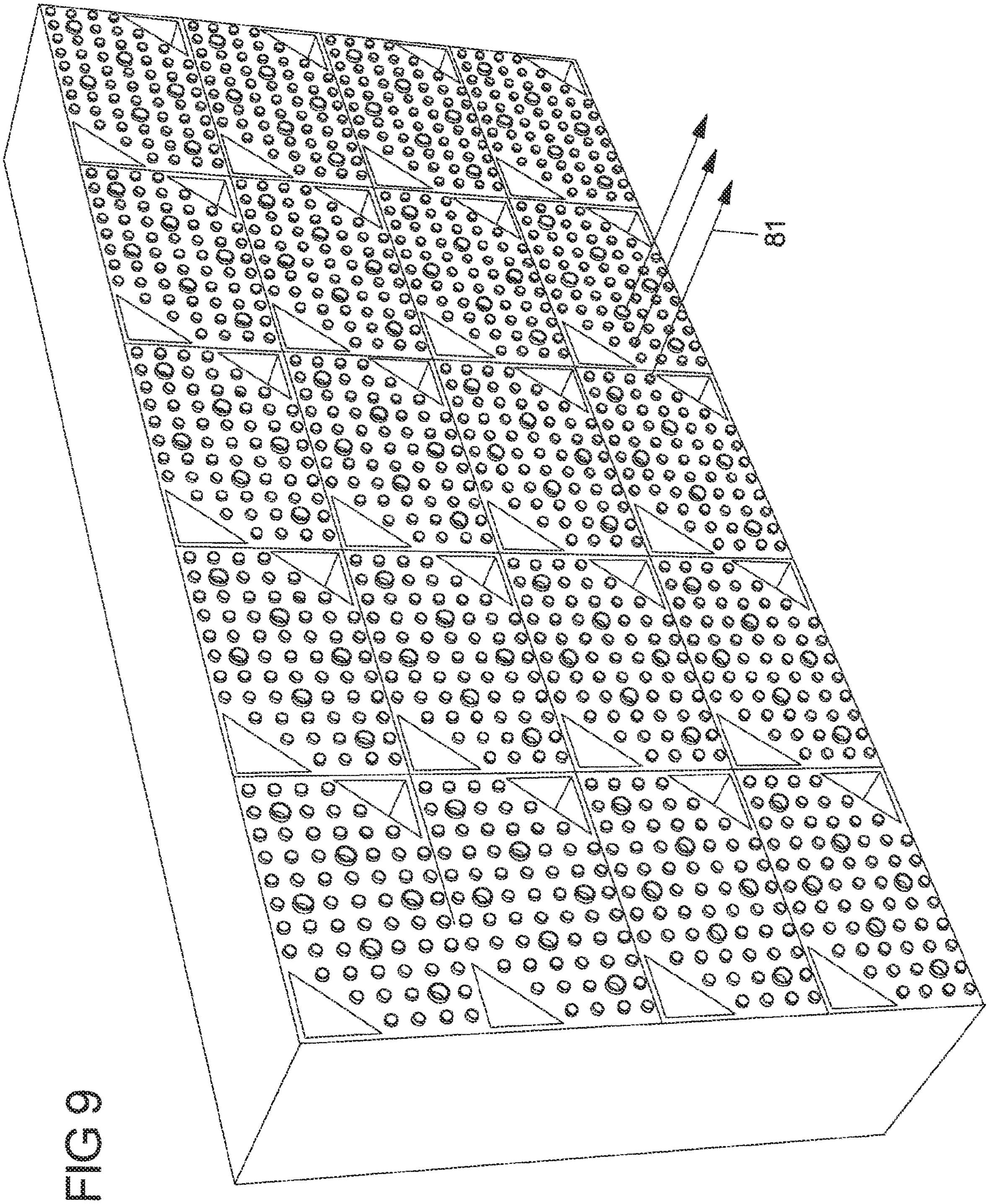
FIG. 9 a perspective view of an embodiment of a modular sound transducer system.

FIG. 9 shows an example of a modular sound transducer system in which a number of sound transducer arrangements—as described above—are used as modules. In principle, the transducer system can have more columns and/or more rows.

Figure 10:
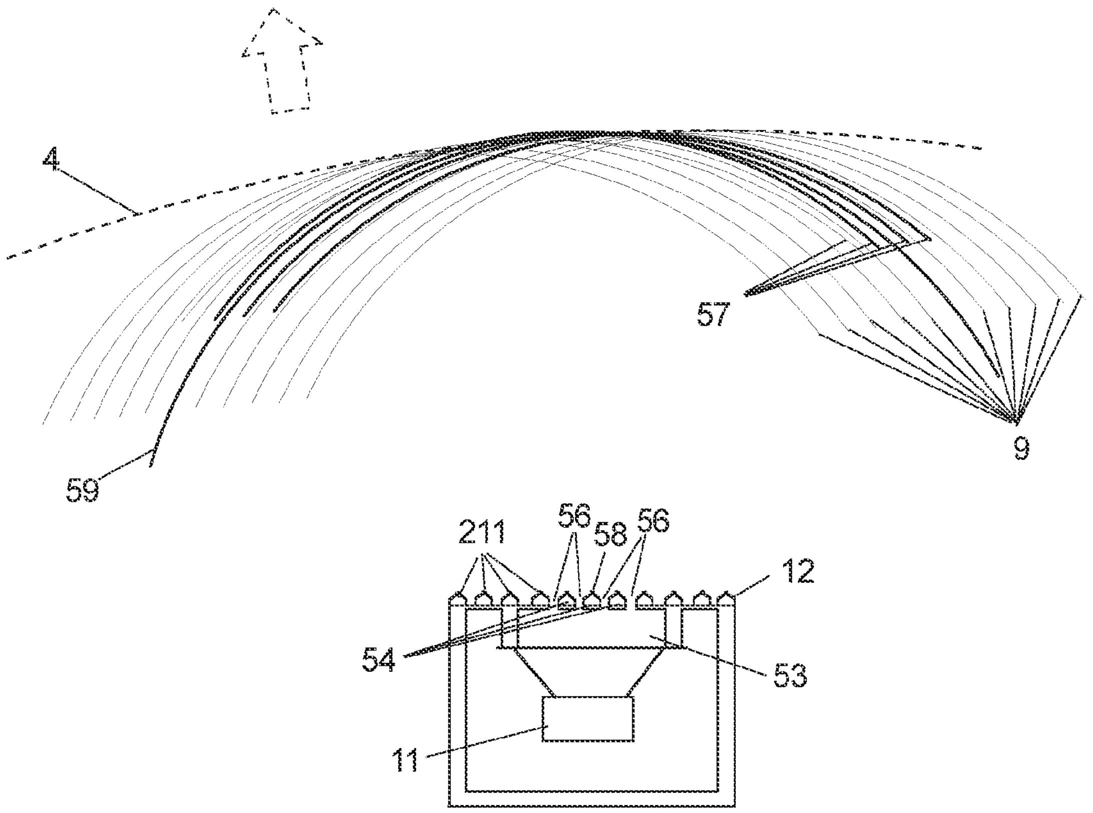
FIG. 10 a further embodiment of a sound transducer arrangement.

FIG. 10 shows an arrangement of several second sound transducers 12, which are also mounted in the air channel of the acoustic low-pass filter device of the first sound transducer 11. This divides the air channel with the vibrating air mass 54 into several sections. The total air mass in the air channel remains unchanged. However, there is no longer a single acoustic centre of the acoustic low-pass filter device, but several air outlets 56. Each of these air outlets 56 forms the starting point of an elementary wave 57 according to Huygens' principle.

These elementary waves 57 each have the same radius in the schematic representation, i.e. they have the same time delay as the elementary wave emanating from the acoustic centre of the first sound transducer 58. It is clearly visible that these elementary waves 57 diverge significantly from the elementary wave 59 of one of the second sound transducers 12 in the acoustic centre of the first sound transducer 11 with increasing deviation from the centre line. However, they remain symmetrically distributed around this elementary wave 59. This means that the pressure maximum of the wavefront of the elementary waves 57 emanating from the multiple acoustic centres (i.e. acoustic centres at the air outlets of the distributed channels of the low-pass acoustic filter device) is in phase with the one elementary wave 59. Thus, the jointly formed wave front remains homogeneous. A common synthesised wave front 4 is formed.

LIST OF REFERENCE SIGNS

1 Sound transducer—Arrangement
11 First sound transducer
12 Second sound transducer
211 Acoustic centre of the first sound transducer
212 Acoustic centre of the second sound transducer
311 Elementary wave of the first sound transducer
312 Elementary wave of the second sound transducer
3111 Direction of propagation of the elementary wave of the first sound transducer
3121 Directional characteristic of the second sound transducer
4 Synthesised wavefront
5 acoustic low-pass filter device
51 Air chamber of the acoustic low-pass filter device
52 Neck/Narrowing of the acoustic low-pass filter device
521 Opening of the neck
53 resilient air volume
54 Oscillating air mass
511 Cone
512 more air chamber
531 Cone volume
532 further air volume
55 Plate
551 Opening in the plate
56 Air outlets
57 Elementary wave of the acoustic centres at the air outlets of the acoustic low-pass filter device
58 Common acoustic centre of the first and second sound transducer
59 Elementary wave of the second sound transducer in the acoustic centre of the acoustic low-pass of the first sound transducer
6 Patterns
611 first sample
612 second sample
7 Three-way module
71 Mid frequency sound transducer
711 Chamber volume of the mid frequency sound transducer
72 Dome sound transducer
721 Dome of the dome sound transducer
73 Bass sound transducer
731 front channel of the bandpass
7311 Front volume of the bandpass
732 rear channel of the bandpass
7321 Bandpass rear volume
8 Direction to a distant listener
81 Main axis of the sound transducer arrangement
9 Elementary waves of the second sound transducer

The invention claimed is:

1. A sound transducer arrangement according to principles of wave field synthesis for alignment of at least one sound wave front, comprising:

at least one first sound transducer comprising any of: a mid-frequency sound transducer, a low-mid-frequency sound transducer, or a low-frequency sound transducer;

an acoustic low-pass filter device coupled to an output of the at least one first sound transducer, wherein the acoustic low-pass filter device comprises a constricted opening smaller than an opening of the at least one first sound transducer, wherein an acoustic center of the acoustic low-pass filter device is aligned with a common acoustic center of the at least one first sound transducer, and wherein the common acoustic center of the at least one first sound transducer is displaceable by the acoustic low-pass filter device for setting a spatial radiation characteristic of the sound transducer arrangement for a homogeneous structure of elementary waves of the sound transducer arrangement; and at least one second sound transducer of the sound transducer arrangement, wherein the at least one second sound transducer comprises high-frequency sound transducers arranged on a surface plane of the acoustic low-pass filter device.

2. The sound transducer arrangement according to claim 1, wherein the acoustic low-pass filter device comprises a mechanical device.

3. The sound transducer arrangement according to claim 1, wherein the acoustic low-pass filter device comprises a resilient air volume in an air chamber in front of the at least one first sound transducer.

4. The sound transducer arrangement according to claim 3, wherein a cone volume of the at least one first sound transducer is part of the air chamber.

5. The sound transducer arrangement according to claim 1, wherein an opening in a plate in front of the at least one first sound transducer is formed as an opening of a neck of the acoustic low-pass filter device.

6. The sound transducer arrangement according to claim 5, wherein the neck of the acoustic low-pass filter device has a circular cross-section.

7. The sound transducer arrangement according to claim 5, wherein the neck of the acoustic low-pass filter device has a polygonal cross-section.

8. The sound transducer arrangement according to claim 1, wherein a plurality of first sound transducers are arranged in a first pattern relative to one another in a first grid pattern.

9. The sound transducer arrangement according to claim 8, wherein the high-frequency sound transducers are arranged in a second grid pattern relative to one another.

10. The sound transducer arrangement according to claim 9, wherein the first grid pattern and the second grid pattern represent a superposition of two grid patterns.

11. The sound transducer arrangement according to claim 1, wherein the acoustic low-pass filter device comprises a Helmholtz resonator.

12. The sound transducer arrangement according to claim 11, wherein the Helmholtz resonator has a property that a numerical value of a ratio of an area of an outlet opening to a product of a volume of its air chamber and a length of its neck is between 100 and 5000, the area and the volume being expressed in square meters and cubic meters respectively, and the length of the neck being expressed in meters.

13. The sound transducer arrangement according to claim 1, wherein a direction of displacement of the common acoustic center of the at least one first sound transducer is collinear with a direction of propagation of the elementary waves generated by the at least one first sound transducer.

14. The sound transducer arrangement according to claim 1, comprising any of: a displaced common acoustic center of the at least one first sound transducer lies in a plane of a height of the at least one second sound transducer of the sound transducer arrangement, or another acoustic center of the at least one second sound transducer of the sound transducer arrangement lies in a plane of a height of the displaced common acoustic center.

15. The sound transducer arrangement according to claim 1, wherein a drive of the at least one second sound transducer of the sound transducer arrangement is configured to compensate for an additional phase rotation of a signal of the at least one first sound transducer, based on coupling with the acoustic low-pass filter device, and wherein the elementary waves are superimposed to form a common wave front.

16. The sound transducer arrangement according to claim 1, wherein a cut-off frequency of the acoustic low-pass filter device is tunable above a crossover frequency of a transmission range of the at least one first sound transducer.

17. The sound transducer arrangement according to claim 1, wherein an air outlet of a channel with its oscillating air mass, which as the acoustic center, is a starting point of the elementary waves of the at least one first sound transducer together with a loudspeaker chassis and the acoustic low-pass filter device ends in a surface plane of another acoustic center of the at least one second sound transducer of the high-frequency sound transducers.

18. The sound transducer arrangement according to claim 1, wherein the acoustic low-pass filter device is formed in dependence on the at least one second sound transducer influencing a cut-off frequency of the at least one first sound transducer and that of an upstream acoustic low-pass filter device when it is mounted in a region of an air outlet of the acoustic low-pass filter device.

19. The sound transducer arrangement according to claim 1, wherein the at least one second transducer is oriented differently from a main axis of the surface plane to linearize a reproduction for listeners located a distance away from the main axis in a radiation direction of the sound transducer arrangement.

20. The sound transducer arrangement according to claim 1, wherein the sound transducer arrangement comprises at least one three-way module, comprising dome high-frequency transducers for audio transmission of an upper frequency spectrum mounted in groups on printed circuit boards at a distance from one another smaller than a distance of mid-frequency loudspeakers from one another to eliminate aliasing effects, and further comprising at least one bass transducer arranged relative to the high-frequency sound transducers and mid-frequency sound transducers and configured as a double-vented bandpass.

21. The sound transducer arrangement according to claim 1, comprising at least two sound transducer arrangements as modules.

22. The sound transducer arrangement according to claim 21, wherein the at least two sound transducer arrangements are arranged such that radiating surfaces of respective sound transducer arrangements are arranged in any of: a plane, as part of a curved surface, or approximate a curved surface.

23. A method for operating a sound transducer arrangement according to principles of wave field synthesis, comprising:

filtering a signal of at least one first sound transducer of the sound transducer arrangement with an acoustic low-pass filter device, wherein the acoustic low-pass filter device comprises an oscillating air mass in a constricted air outlet opening smaller than an opening of the at least one first sound transducer;

coupling common acoustic centers of the at least one first sound transducer and the acoustic low-pass filter device, wherein the at least one first sound transducer is formed as any of: a mid-frequency sound transducer, a low-mid-frequency sound transducer, or a low-frequency sound transducer arranged on a surface plane of the acoustic low-pass filter device, and further coupling to an acoustic center of at least one second sound transducer, of the sound transducer arrangement, wherein the at least one second sound transducers comprises high-frequency sound transducers; and wherein the common acoustic center of the at least one first sound transducer is displaceable by the acoustic low-pass filter device for setting a spatial radiation characteristic of the sound transducer arrangement for a homogeneous structure of elementary waves of the sound transducer arrangement.

24. The method according to claim 23, wherein actuation of the at least one second sound transducer of the sound transducer arrangement is delayed in order to compensate for an additional phase rotation of a signal of the at least one first sound transducer, which is produced by coupling the at least one first sound transducer to the acoustic low-pass filter device, wherein the elementary waves are superimposed to form a common wave front.

* * * * *